(12) United States Patent
Jiang (10) Patent No.: US 8,473,563 B2
(45) Date of Patent: Jun. 25, 2013

(54) EXTENSIBLE SCHEDULING OF MESSAGES ON TIME-TRIGGERED BUSSES

(75) Inventor: Shengbing Jiang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2885 days.

(21) Appl. No.: 11/112,447

(22) Filed: Apr. 22, 2005

(65) Prior Publication Data

US 2006/0242252 A1 Oct. 26, 2006

(51) Int. Cl.
*G06F 15/16* (2006.01)

(52) U.S. Cl.
USPC .......................................... 709/208; 709/204

(58) Field of Classification Search
USPC ........................................................ 709/207
See application file for complete search history.

(56) References Cited

U.S. PATENT DOCUMENTS

| | | | | |
|---|---|---|---|---|
| 6,957,432 B2* | 10/2005 | Ballantyne | ..................... | 718/100 |
| 6,990,665 B2* | 1/2006 | Ballantyne | ..................... | 718/100 |
| 7,472,393 B2* | 12/2008 | Ballantyne | ..................... | 718/108 |
| 2002/0078121 A1* | 6/2002 | Ballantyne | ..................... | 709/102 |
| 2003/0187907 A1* | 10/2003 | Ito | ..................... | 709/102 |
| 2005/0022187 A1* | 1/2005 | Park | ..................... | 718/100 |
| 2006/0253853 A1* | 11/2006 | Jiang | ..................... | 718/100 |

OTHER PUBLICATIONS

Mark Lewis, Bahram Alidaee, Gary Kochenberger, "Using xQx to model and solve the uncapacitated task allocation problem", Apr. 2004, www.elsevvier.com;locate/dsw, Operations Research Letters 33 (2005) 176-182.*
DiNatale, Marco and Stankovic, Johon, "Dynamic End-to-end Guarantees in Distributed Real Time Systems", 1994 IEEE, pp. 216-227.
Beilner, H. and Gelenbe, E. "Modeling and Performance Evaluation of Computer Systems" Proceedings of the International Workshop organized by The Commission of the European Communities, Oct. 4-6, 1976, 4 pgs.
Blazewicz, J. "Scheduling Dependent Tasks with Different Arrival Times to Meet Deadlines", Modeling and Performance Evaluation of Computer Systems, North Holland Publishing Company (1997), pp. 57-65.
Lee, Chunho, Potkonjak, Miodrag, and Wolf, Wayne, "Synthesis of Hard Real-Time Application Specific Systems", Aug. 29, 2002, http://www.cs.ucla.edu/~miodrag/papers/J_Lee_98.pdf.

* cited by examiner

*Primary Examiner* — Hua Fan

(74) *Attorney, Agent, or Firm* — John A. Miller; Miller IP Group, PLC (57) ABSTRACT

A scheduling algorithm for scheduling messages on a time-triggered bus in a distributed real-time embedded system. The algorithm first determines an initial message schedule for assigning the messages to time slots on the bus so that predetermined precedent relationships are enforced. In one embodiment, the algorithm uses an earliest-deadline-first schedule to determine the initial message schedule. The algorithm then reallocates the messages in the time slots to provide unused time slots between the messages. In one embodiment, the reallocating the messages includes solving a quadratic optimization problem. Also, the messages are reallocated in the time slots so that they are substantially evenly spaced.

20 Claims, 4 Drawing Sheets

EXTENSIBLE SCHEDULING OF MESSAGES ON TIME-TRIGGERED BUSSES

BACKGROUND OF THE INVENTION

1. Field of the Invention

This invention relates generally to a process for scheduling messages on a time-triggered bus and, more particularly, to a process for scheduling messages on a time-triggered bus in a distributed embedded system that includes determining an initial message schedule for assigning the messages to time slots on the bus where timing requirements are satisfied, and then reallocating the messages in the time slots to provide unused time slots between the messages for future extensibility.

2. Discussion of the Related Art

Embedded systems are known in the art that include a plurality of distributed processors that transmit digital messages between each other on a time-triggered communications bus. The system employs software tasks allocated to each individual processor. The tasks executed by the processors transmit messages between the processors on the communications bus. Because the bus is time-triggered, only one message is transmitted on the bus at a time. The tasks are periodic and have hard deadlines that may produce catastrophic results if not met. For example, in an automotive steer-by-wire embedded system, it is necessary that the outputs from the various processors in the system have strict deadlines. There are also precedent constraints for the tasks where one task may need to be executed before another task is executed, possibly within a single execution period. Therefore, it is necessary that the system properly schedule the execution of the tasks in each processor and the transmission of the task messages on the bus so that all of the deadlines are met and all of the constraints are satisfied.

It is desirable that the scheduling employed in an embedded system be extensible so that if changes are needed or upgrades are developed after the initial implementation of the system, such as adding or removing processors and/or adding or removing tasks, the original schedule is not affected. For example, if a task set is changed at one processor or a new processor is added to the system, then it is desirable that this change not affect the schedules for the tasks and message transmissions of the other processors. If the new messages can be transmitted on the bus without affecting the transmission of the existing messages, then no change is needed for the scheduling of the other processors already in use. Otherwise, it may be necessary to reprogram the bus schedule at great expense.

SUMMARY OF THE INVENTION

In accordance with the teachings of the present invention, a scheduling algorithm is disclosed for scheduling processor tasks and messages in a distributed real-time time-triggered embedded system. The scheduling algorithm first identifies the earliest starting transmission time and the latest ending transmission time for each message to be transmitted on a communications bus during one transmission cycle to determine a message transmission time-window. The algorithm then identifies a task execution time-window for each task to be performed in each processor based on the transmission time-window for each message. Based on the task execution time-windows, the algorithm then derives a usage request function for each processor in the system, where the usage request function is the addition of usage requests for each task to be executed by the processor. From the usage request function for each processor, the algorithm computes a peak usage request for each processor and an average usage request for each processor. The algorithm then optimizes the message transmission time-windows by minimizing the peak usage request and the average usage request for each processor. From the optimized message transmission time-windows, the algorithm then provides independent scheduling for the tasks executed by each individual processor and the messages transmitted on the bus, where the processors are decoupled from each other and the bus.

Once the optimized message transmission time-window for each message is determined on the communications bus, the algorithm can make the scheduling even more accommodating for later upgrades by selectively assigning time slots within the time-window for the messages so that future messages can be added to time slots between the messages in the transmission cycle. In this embodiment, the algorithm first determines an initial message schedule where the messages are assigned a certain time slot within their transmission time-window, using, for example, an earliest-deadline-first scheduling process, based on a known scheduling technique. The algorithm then reallocates the messages as evenly as possible within the transmission cycle, but still maintaining the messages within a time slot in their transmission time-window. Reallocating the messages within the time windows may include solving for a quadratic optimization problem that provides an optimization model. The real numbers of the solution of the quadratic optimization problem are rounded down to the nearest integer so that the messages are positioned within a time slot in their assigned time-window to allow unused time slots to be available between the messages to provide the future extensibility.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a process for scheduling processor tasks and message transmissions on a communications bus in an embedded system to increase system schedulability and extensibility is merely exemplary in nature, and is in no way intended to the limit the invention or its applications or uses.

Figure 1:
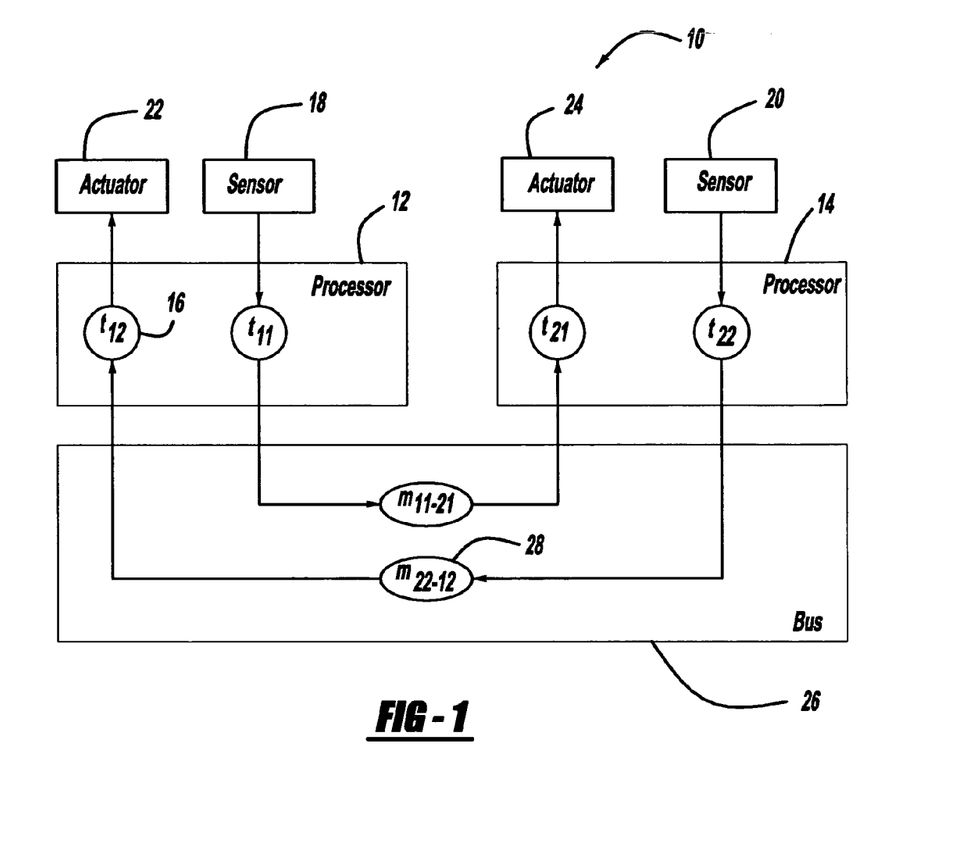
FIG. 1 is a diagram of an embedded system including a plurality of processors connected to a communications bus.

FIG. 1 is a plan view of an embedded system 10 of the type discussed above that includes a plurality of processors 12 and 14 that are programmed to perform a plurality of tasks 16. In one example, each processor 12 and 14 receives signals from an appropriate sensor 18 and 20, respectively, for a particular application. Additionally, the processors 12 and 14 control an actuator 22 and 24, respectively, for the particular application. The results of the various tasks 16 executed by the processors 12 and 14 are transmitted between the processors 12 and 14 on a time-triggered communications bus 26 as messages 28.

In this example, task $t_{11}$ in the processor 12 receives signals from the sensor 18 and sends a message $m_{11-21}$ on the bus 26 to task $t_{21}$ in the processor 14, which issues a command to the actuator 24. Likewise, task $t_{22}$ in the processor 14 receives signals from the sensor 20 and sends a message $m_{22-12}$ on the bus 26 to the task $t_{12}$, which issues a command to the actuator 22. There are end-to-end deadlines for the data sensing and the command issuing. According to the invention, the task executions for the processors 12 and 14 and the message transmissions on the bus 26 are scheduled so that all of the deadlines are met, all the precedent constraints are satisfied, such as $t_{11} \rightarrow m_{11-21} \rightarrow t_{21}$, and the schedules generated are extensible for later upgrades.

The known scheduling techniques for the type of embedded system discussed above have scheduling and extensibility limitations because the task scheduling in the processors are coupled, i.e., all of the processor tasks are scheduled together. This coupling is a result of the precedence relationship between the tasks 16 in the processors 12 and 14. The present invention proposes decoupling the processors 12 and 14 in the embedded system 10 to provide the task scheduling and the message scheduling by enforcing the precedence relations through time-slicing, i.e., assigning specific time-windows for the transmission of the messages 28 on the bus 26, so that the scheduling of the tasks 16 in the processors 12 and 14 can be performed independently from each other. In other words, the scheduling algorithm first identifies an optimized time-window for the messages 28 to be transmitted on the bus 26 between the processors 12 and 14, and then based on when the messages 28 will be transmitted, determines when the tasks 16 need to be executed to generate the messages 28. This distributed scheduling as a result of decoupling the processors 12 and 14 allows for single processor scheduling that can be solved effectively.

The time-window for the message transmissions to provide the system schedulability and extensibility is determined while satisfying the timing requirements and the precedent constraints. The time-window determination is an optimization problem that includes minimizing an objective function, but satisfying precedent constraints, which can be solved by many existing algorithms. The main challenge is how to obtain the objective function for schedulability and extensibility. According to one embodiment of the invention, the schedulability and the extensibility are related to peak processor usage request and average processor usage request.

For the calculations discussed below, there are m processors and N tasks, where the tasks 16 are already allocated to the processors 12 and 14. The task set is defined by ($t_{ij}$, i=1, ..., m, j=1, ..., $n_i$), where the tasks ($t_{ij}$, j=1, ..., $n_i$) are allocated to the processor $p_i$ and $$\sum_{i=1}^{m} n_i = N.$$

For each task $t_{ij}$, $A_{ij}$ is its arrival time, $C_{ij}$ is its worst case execution time, $D_{ij}$ is its deadline, and $T_{ij}$ is its period. The order of performing the tasks 16 has a known precedent. The precedent relationships are represented as "$t_{ij}$ precedes $t_{kl}$" (also denoted as $t_{ij} \rightarrow t_{kl}$), which means that the task $t_{ij}$ must be executed before the task $t_{kl}$ within one period. It is necessary to schedule the task executions for each processor 12, 14 so that all of the deadlines are met, all of the precedent constraints are satisfied and the derived schedules are extensible for later upgrades.

The task and message scheduling of the invention is based on the assumptions that there is no communication delay between the tasks 16, i.e., the output of a task $t_{ij}$ can be transmitted to another task $t_{kl}$ as an input without delay, and all of the tasks 16 have the same period, i.e., $T_{ij}$=T for all i and j. The first assumption results from the fact that the communications bus 26 can be modeled as a special processor and the messages 28 transmitted on the bus 26 can be viewed as tasks to be executed on the bus processor. For example, if the task $t_{ij}$ needs to send a message $m_{ij-kl}$ to task $t_{kl}$ on the bus 26 because of the precedence relation "$t_{ij}$ proceeds $t_{kl}$," then the bus 26 can be viewed as a processor $p_b$ and the message $m_{ij-kl}$ as a task to be executed on $p_b$. Its arrival time can be the same as the arrival time of $t_{ij}$, its execution time can be equal to its transmission time, its deadline can be the same as the deadline of $t_{kl}$ and its period can be the same as the period of $t_{ij}$. Also, the precedence relationship "$t_{ij}$ precedes $t_{kl}$" is replaced by "$t_{ij}$ precedes $m_{ij-kl}$" and "$m_{ij-kl}$ precedes $t_{kl}$."

The second assumption is provided because tasks with different periods can always be transformed to tasks with the same period. If the tasks have different periods, only the scheduling for the time interval that is equal to the least common multiple of the periods of all tasks needs to be solved. Therefore, every invocation of each task within the interval can be treated as a new task, and all of the new tasks will have the same period that is equal to the least common multiple of the periods of all of the old tasks. Then, instead of solving the scheduling for the set of old tasks with different periods, the scheduling can be solved with a set of new tasks with the same period.

To solve for the above described extensible distributed scheduling, a time-slicing approach is employed to decouple the scheduling for the processors 12 and 14. In the decoupling approach, for each message $m_{ij-kl}$ on the bus 26, a message time-window [$b_{ij-kl}$, $e_{ij-kl}$] is assigned for its transmission so that all of the precedent constraints among the processors 12 and 14 are satisfied by the time-window assignments, and all of the necessary timing requirements are satisfied. Particularly, the following constraints are defined:

$$b_{ij-kl} \geq B_{ij-kl} \tag{1}$$

$$e_{ij-kl} - b_{ij-kl} \geq C_{ij-kl} \tag{2}$$

$$e_{ij-kl} \leq E_{ij-kl} \tag{3}$$

$$b_{ij-kl} - e_{hv-il} \geq \max_{q} \sum_{t_{ip} \in chain_{il-ij}^q} C_{ip} \text{ for all } k \neq i \text{ and } h \neq i \tag{4}$$

In equations (1)-(4), $B_{ij-kl}$ and $E_{ij-kl}$ are the earliest starting time and the latest ending time, respectively, for the transmission of the message $m_{ij-kl}$. $B_{ij-kl}$ and $E_{ij-kl}$ are obtained by an algorithm discussed below that ensures that all of the tasks in the dependency chain preceding $m_{ij-kl}$ are completed before $B_{ij-kl}$, and after the messages arrival, and all of the tasks in the dependency chain succeeding $m_{ij-kl}$ are completed after $E_{ij-kl}$, and before the messages deadline. $C_{ij-kl}$ is the transmission time for the message $m_{ij-kl}$. Equation (2) states that the time-window [$b_{ij-kl}$, $e_{ij-kl}$] is longer than $C_{ij-kl}$ so that the message $M_{ij-kl}$ is transmitted within the time-window. $chain_{il-ij}^q$ is the qth task chain in the processor $p_i$ between $t_{il}$ and $t_{ij}$, $chain_{il-ij}^q = \{t_{il}, t_{iq1}, \ldots, t_{iqr}, t_{ij}|t_{il} \to t_{iq1} \to \ldots \to t_{iqr} \to t_{ij}\}$. Equation (4) states that the tasks in the processor $p_i$ between the messages $m_{hv-il}$ and $m_{ij-ku}$, according to the dependency relationship, are completed within the time-window $[e_{hv-il}, b_{ij-ku}]$ between the time-windows of $m_{hv-il}$ and $m_{ij-ku}$. Note that $b_{ij-kl}$ and $e_{ij-kl}$ are not the exact starting time and finishing time of the transmission for $m_{ij-kl}$, and $[b_{ij-kl}, e_{ij-kl}]$ is only a time-window within which the transmission of the message $m_{ij-kl}$ is scheduled, so $b_{ij-kl}$ and $e_{ij-kl}$ can be viewed as a new arrival time and a new deadline of the message $m_{ij-kl}$.

Figure 2:
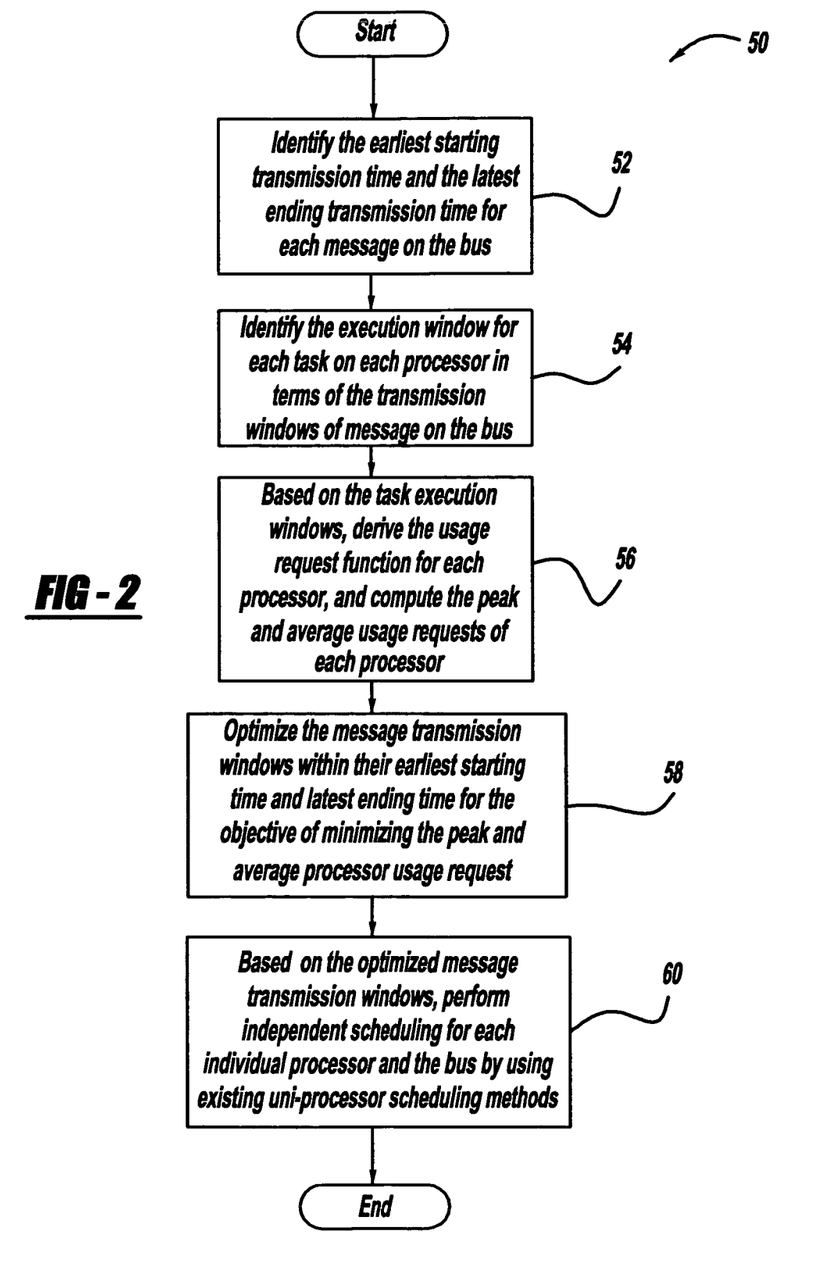
FIG. 2 is a flow chart diagram showing an operation for scheduling messages and tasks in the system shown in FIG. 1, according to an embodiment of the present invention.

FIG. 2 is a flow chart diagram 50 showing the operation of the algorithm for determining the scheduling of the various messages 28 and tasks 16 for the embedded system 10, according to the invention. The algorithm first identifies the earliest starting transmission time $B_{ij}$ and the latest ending transmission time $E_{ij}$ for each message that is to be transmitted on the bus 26 at box 52. The following algorithm can be used to obtain the earliest starting time $B_{ij}$ and the latest ending time $E_{ij}$ for each task 16 and each message 28 that ensures that all of the preceding tasks in the dependency chain are able to be completed before time $B_{ij}$ and after their arrival time, and all of the succeeding tasks in the dependency chain are able to be completed after time $E_{ij}$ and before their deadlines. In this algorithm, the bus 26 is viewed as a processor and the messages $m_{ij}$ are viewed as tasks.

Starting from the tasks having no successor and processing on every step those tasks whose successors have been processed:

$$E_{ij} = \min\left\{D_{ij}, \min_{t_{ij} \to t_{kl}, k \neq i}\{E_{kl} - C_{kl}\}, G_{ij}\right\} \quad (5)$$

Let $EK_{ij} = \{t_{il}|t_{ij} \to \ldots \to t_{il}\}$, i.e., the set of successor tasks of $t_{ij}$ on the processor $p_i$. Suppose there are h different latest ending times for the tasks in $EK_{ij}$, denoted as $E_1 > E_2 > \ldots > E_h$. Then, $G_{ij}$ is computed by the following procedure:

$$S_1 = \sum_{t_{ip} \in EK_{ij}, E_{ip}=E_1} C_{ip} \quad (6)$$

For $k = 2$ to $k = h$, $$S_k = \sum_{t_{ip} \in EK_{ij}, E_{ip}=E_k} C_{ip}$$

If $E_k > E_{k-1} S_{k-1}$, then $S_k = S_k + E_K - (E_{k-1} - S_{k-1})$ $G_{ij} = E_h - S_h$.

Starting from the tasks 16 having no predecessor and processing on every step those tasks whose predecessors have been processed:

$$B_{ij} = \max\left\{A_{ij}, \min_{t_{kl} \to t_{ij}, k \neq i}\{B_{kl} + C_{kl}\}, F_{ij}\right\} \quad (7)$$

Let $BK_{ij} = \{t_{il}|t_{ij} \to \ldots \to t_{ij}\}$, i.e., the set of predecessor tasks of $t_{ij}$ on the processor $p_i$. Suppose there are h different earliest starting times for the tasks in $BK_{ij}$, denoted as $B_1 < B_2 < \ldots < B_h$. Then, $F_{ij}$ is computed by the following procedure:

$$S_1 = \sum_{t_{ip} \in BK_{ij}, B_{ip}=B_1} C_{ip} \quad (8)$$

For $k = 2$ to $k = h$, $$S_k = \sum_{t_{ip} \in BK_{ij}, B_{ip}=B_k} C_{ip}$$

If $B_k < B_{k-1} + S_{k-1}$, then $S_k = S_k + (B_{k-1} + S_{k-1}) - B_k$ $F_{ij} = B_h + S_h$.

In the above algorithm for obtaining the earliest starting time and the latest ending time for each task 16 and message 28, $G_{ij}$ is determined to make sure that every successor task $t_{ij}$ for the processor $p_i$ is able to be completed and meet its own latest ending time. Because there may be partial order among the successor tasks, special attention must be given to the fact that those tasks are executed in the same processor 12 or 14 when computing $G_{ij}$. For example, suppose there are two successor tasks $t_{i1}$ and $t_{i2}$ of the task $t_{ij}$, and there is no dependency between $t_{i1}$ and $t_{i2}$. Let $E_1 = 4$ and $E_2 = 3$ be the latest ending time of $t_{i1}$ and $t_{i2}$, respectively, and $C_{i1} = 2$ and $C_{i2} = 1$ be their respective worst case execution time. By letting $G_{ij} = \min(E_1 - C_{i1}, E_2 - C_{i2}) = 2$, then it is incorrect. Because the total execution time for the two tasks is three and the time-window is $E_1 - G_{ij} = 2$, it is clear that starting from the time $G_{ij} = 2$, $t_{i1}$ and $t_{i2}$ cannot both be finished before their ending time on the same processor 12 or 14. The procedure given in the above algorithm for $G_{ij}$ is correct when considering that those tasks are executed by the same processor 12 or 14. It is easy to determine that by following the procedure, $G_{ij} = 0$ for the above example is correct. A similar procedure is also provided for $F_{ij}$ in the above algorithm.

The algorithm then identifies an execution time-window for each task 16 for each processor 12, 14 whose message is to be transmitted on the bus 26, based on the transmission time-windows of the messages 28 at box 54. In one embodiment, the following algorithm calculates the time-window for performing the individual tasks in the processors 12 and 14 based on the message transmission time-windows for the results of the tasks 16, particularly $wb_{ij}$ and $we_{ij}$. For message tasks $m_{ij-kl}$ on the bus 26, $wb_{ij-kl} = b_{ij-kl}$ and $we_{ij-kl} = e_{ij-kl}$, and for tasks $t_{ij}$ on each non-bus processor $p_i$, starting from the tasks 16 having no successor on the processor $p_i$ and processing on every step those tasks 16 whose successors on $p_i$ have been processed.

$$we_{ij} = \begin{cases} \min\{E_{ij}, \min_{l:t_{ij} \to t_{il}} we_{il}\} & \exists (q, r): t_{ij} \to m_{ij-qr} \\ \min\{E_{ij}, \min_{(q,r)} wb_{ij-qr}, Y\} & \text{otherwise} \end{cases} \quad (9)$$

Where $$Y = \min_{(u,v): t_{ij} \to t_{i\eta} \to \ldots t_{i\eta_k} \to m_{ir_k - uv}} \left(wb_{ir_k - uv} - \sum_{h=1}^{k} C_{ir_h}\right).$$

For tasks $t_{ij}$ on each non-bus processor $p_i$, starting from the tasks 16 having no predecessor on the processor $p_i$ and processing on every step those tasks 16 whose predecessors on the processor $p_i$ have been processed:

$$we_{ij} = \begin{cases} \max\{B_{ij}, \max_{l:t_{ij} \to t_{ij}} wb_{il}\} & \nexists (q,r): m_{qr-ij} \to t_{ij} \\ \max\{B_{ij}, \max_{(q,r)} we_{qr-ij}, Z\} & \text{otherwise} \end{cases} \quad (10)$$

Where $$Z = \max_{(u,v): m_{uv-ir_1} \to t_{i\eta} \to \ldots t_{i\eta_k} \to t_{ij}} \left( we_{uv-ir_1} + \sum_{h=1}^{k} C_{ih} \right).$$

In the above computation of $we_{ij}$, when the task $t_{ij}$ does not have any immediate successor on other processors 12, 14, $\exists$ $(q,r): t_{ij} \to m_{ij-qr}$, $we_{ij} = \min\{E_{ij}, \min_{l:t_{ij} \to t_{il}}(we_{il} - C_{il})\}$ can also be used instead of what is used in the algorithm. The intent of this decision in the algorithm is that when the task $t_{ij}$ does not have any immediate successor on other processors 12 and 14, the task $t_{ij}$ is combined with its successors on the same processor 12 or 14, i.e., the task $t_{il}$, as one super-task for a computation of a usage request function, which is provided by trying to assign the same usage window for the two tasks. Because the main purpose is to identify the time-windows for the message on the bus 26 so that the scheduling on each processor 12, 14 can be decoupled, each individual task 16 is not scheduled at this time. The task scheduling on each individual processor 12, 14 is performed after the time-windows for the messages are optimized. Here, the determination of the processor usage window for each task 16 will lead to the computation of the usage request function, which will be used later for the determination of the optimized time-windows for the messages on the bus 26.

Because the task $t_{ij}$ has no immediate successor on other processors 12, 14, implying that it has no direct impact on the time-windows of the messages on the bus 26, it naturally follows that it is desirable to combine $t_{ij}$ with its successor for the computation of the usage request function by trying to assign the same usage window for $t_{ij}$ and its successors, which would eventually help to simplify the determination of the optimized time-windows for the messages on the bus 26. This also applies to the decision in the algorithm for the computation of $wb_{ij}$ when the task $t_{ij}$ does not have any immediate predecessor on the other processors 12, 14.

The question then remains as to how to determine $b_{ij-kl}$ and $e_{ij-kl}$ for the desired schedulability and the extensibility, i.e., how to determine $b_{ij-kl}$ and $e_{ij-kl}$ so that it is more feasible to schedule the tasks 16 on each processor 12, 14 and the schedules derived are more extensible to accommodate changes for later upgrades. In other words, determining the time-window is a constrained optimization problem, where the constraints are provided by equations (1)-(4), and the objectives for optimization are schedulability and extensibility.

According to the invention, an objective function for schedulability and extensibility is defined that includes a peak usage request and an average processor usage request for each processor 12 and 14. Particularly, from the identified task execution time-windows, the algorithm derives a usage request function for each processor 12 and 14, and then computes the peak usage request and the average usage requests for each processor 12 and 14 at box 56. First, the usage request function for each task $t_{ij}$, $f_{ij}(t):[0,T] \to R$ is defined as:

$$f_{ij}(t) = \begin{cases} \dfrac{C_{ij}}{we_{ij} - wb_{ij}} & t \in [wb_{ij}, we_{ij}] \\ 0 & \text{otherwise} \end{cases} \quad (11)$$

Where T is the common period, R is the set of real numbers, $C_{ij}$ is the worst case execution time of $t_{ij}$, and $[wb_{ij}, we_{ij}]$ is the processor usage window requested by $t_{ij}$ that is determined from the message transmission windows.

From the usage request function for each task 16, the usage request function for each processor $p_i$, $g_i(t)[0,T] \to R$, is defined as:

$$g_i(t) = \sum_{j=1}^{n_i} f_{ij}(t) \quad (12)$$

Then, the peak usage request for each processor 12, 14 is determined as:

$$PU_i = \max_{t \in [0,T]} g_i(t) \quad (13)$$

From equations (11) and (12):

$$PU_i = \max_{t \in \{wb_{ij}, j=1,\ldots,n_i\}} g_i(t) \quad (14)$$

The average usage request for each processor 12, 14 is defined as:

$$AU_i = \frac{\int_0^T g_i^2(t)\,dt}{\int_0^T g_i(t)\,dt} \quad (15)$$

Since $$\int_0^T f_{ij}(t)\,dt = C_{ij},$$

then:

$$AU_i = \frac{\int_0^T g_i^2(t)\,dt}{\sum_{j=1}^{n_i} C_{ij}} \quad (16)$$

The algorithm then optimizes the message transmission time-windows within their earliest starting time and latest ending time based on the objective function for minimizing the peak and average processor usage requests at box 58 to provide the desired schedulability and extensibility. In one embodiment, the objective function for the message time-window optimization is defined as:

$$O(b_{ij-kl}, e_{ij-kl}) = \sum_{i=1}^{m} \alpha_i(PU_i^2 + AU_i^2) \quad (17)$$

Where $$\sum_{i=1}^{m} \alpha_i = 1, \alpha_i$$

is the weight for the processor $p_i$ and is determined by the system designer. In general $\alpha_i=1/m$. If the schedulability and extensibility of a processor is more important, then the corresponding weight for the processor can be increased. The objective function gives the peak usage request and the average usage request for all of the processors 12, 14 in the system 10.

The reason that the usage request is used to determine the objective function is that the value of the resource usage request represents the level of contention for the resources. If the usage request can be balanced among all of the resources, and over the whole execution period, then the contention for the resources can be reduced on each processor/bus and at each time over the whole execution period, which will make each individual processor/bus scheduling much easier. Because the contention for the resources is reduced, it would be easier to add tasks/processors within the existing schedule without changing the schedule. Thus, the above objective function captures both the desired schedulability and extensibility.

The time-window optimization can now be formulated as an optimization with linear constraints and non-linear objective functions subject to the constraints of equations (1)-(4) as:

$$\min_{b_{ij-kl}, e_{ij-kl}} O(b_{ij-kl} e_{ij-kl}) \quad (18)$$

Figure 3:
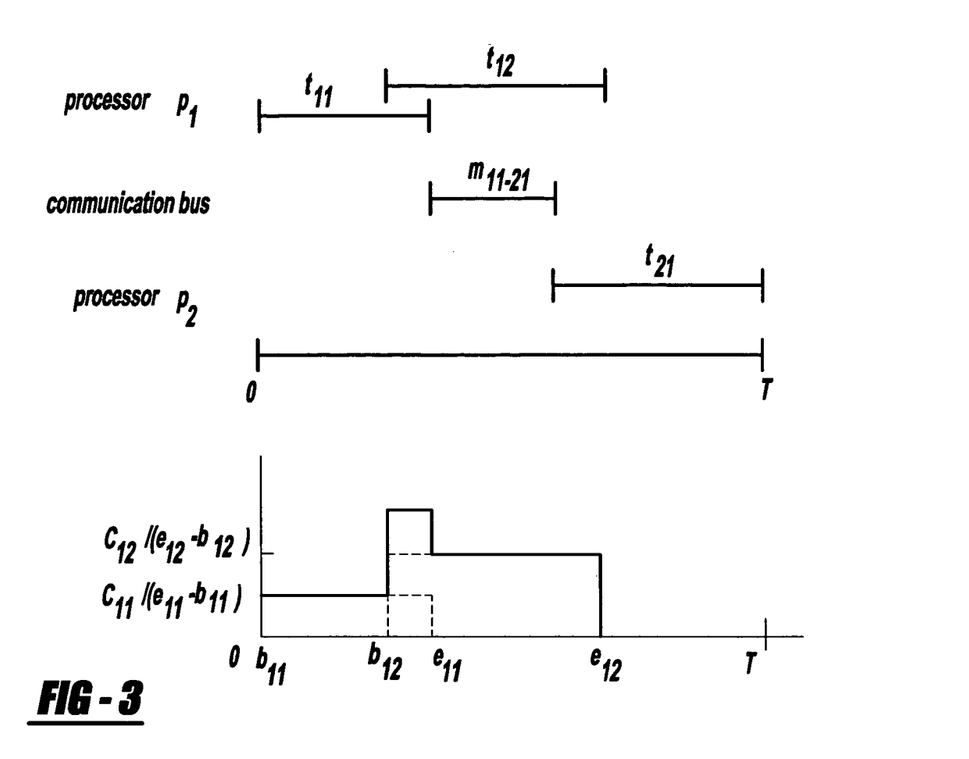
FIG. 3 is a diagram showing a usage request function for a processor in scheduling the system shown in FIG. 1.

FIG. 3 is a diagram illustrating how the usage request function of equation (12) is defined for a processor and how the objective function of equation (17) is defined. Tasks $t_{11}$ and $t_{12}$, whose execution time-windows overlap, are to be executed by processor $p_1$ and task $t_{21}$ is to be executed by processor $p_2$. Because task tol must be performed before task $t_{21}$, the message time-window $m_{11-12}$ is defined between the execution time-windows for task $t_{11}$ and task $t_{21}$. From this the usage request function of the processor $p_1$ is shown in the graph from which the objective function is calculated as discussed above.

Based on the optimized message transmission time-window, the algorithm then performs independent task scheduling for each processor 12, 14 and the bus 26 by using any suitable known uni-processor scheduling technique at box 60. Particularly, after the message time-windows are optimized for all of the messages 28, the scheduling for the tasks 16 in each processor 12, 14 can be solved independently by using max $(A_{ij}$, $\max_{(q,r): t_{qr} \to t_{ij}, q \neq i}(e_{qr-ij}))$ and $\min(D_{ij}$, $\min_{(k,l): t_{ij} \to t_{kl}, k \neq i}(b_{ij-kl}))$ as the new arrival time and the new deadline, respectively, of the task $t_{ij}$ for the processor $p_i$, i=1, ... m, and j=1 ... $n_i$, because the dependency among $t_{qr}$, $m_{qr-ij}$, $t_{ij}$, $m_{ij-kl}$, and $t_{kl}$ are enforced by the new arrival time and the new deadline. Any of the several and existing suitable single processor scheduling methods can be used for scheduling the tasks 16 in each individual processor 12 and 14. Note that the dependencies among the tasks 16 for the same processor are not enforced by the new arrival times and the new deadlines. Further, only the dependencies among the tasks 16 in the processors 12 and 14 are enforced by the new arrival times and the new deadlines. In other words, in the uni-processor scheduling process, the task dependencies in the same processor still need to be considered.

Once the optimized time-window for each message is determined for each message as discussed above at the box 58, another embodiment of the present invention determines which time slot in the optimized time-window the message 28 will actually be sent on the bus 26 so that the messages are spaced apart in time to allow other messages to be inserted into the schedule at a later date if desired to further increase the schedulability. It is stressed that the above described process shown in the flow chart diagram 50 does not need to use the following time slot reallocation procedure in that other time slot allocation procedures can be used. Also, the following described time slot reallocation procedure does not need to be used in the process described above for decoupling the processors 12 and 14.

The scheduling technique of this embodiment of the invention can further be described as follows. Suppose the transmission cycle of a time-triggered communications bus consists of N slots, where there are m messages to be scheduled in the N slots for transmission. For each message m, $A_m$, $D_m$ and $C_m$ are its arrival time, deadline and transmission time, respectively. Note that $A_m$, $D_m$ and $C_m$ are all integers, and are measured by the number of the time slots. There are also precedence relationships among the messages m, which are represented in the form of "message i precedes message j," or in short "i precedes j." The messages 28 need to be transmitted in the time slots, i.e., to determine what time slot to use to transmit what message m, so that all the deadlines are met and all the precedence relationships are satisfied. It is also desirable that the schedule be extensible, i.e., if some changes are needed after the implementation of the system 10, such as adding or removing processors or adding or removing tasks for the purpose of upgrading, the schedule for the remaining messages m on the bus 26 would not be affected. For example, if the task set is changed at one processor 12, 14 or a new processor is added to the system 10, then it is necessary that this change not impact the schedule for the remaining messages 28 on the bus 26. If the new messages m can be transmitted on the bus 26 without affecting the transmission of the existing messages, then no change is needed for the schedule of the existing messages m, which means that the task schedules for those corresponding processors 12, 14 remain unchanged. Otherwise, it may be necessary to rebuild the schedule for the whole system, which may be very costly.

Figure 4:
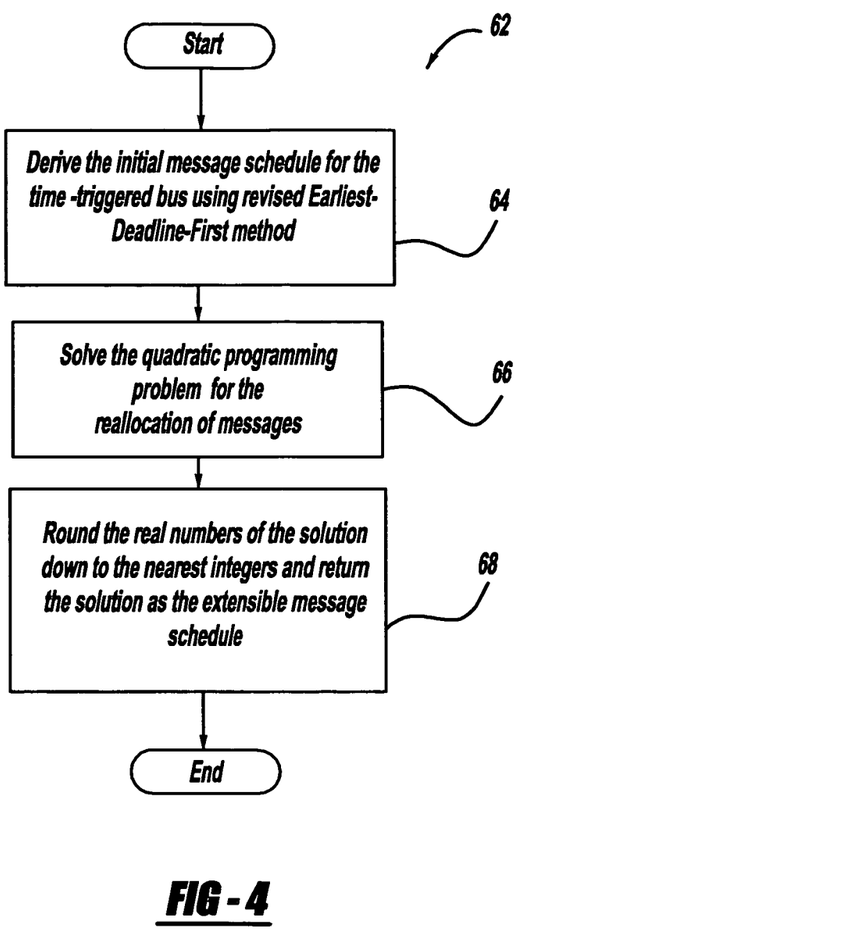
FIG. 4 is a flow chart diagram showing a process for scheduling messages in time slots within a transmission cycle on a time-triggered bus for the system shown in FIG. 1, according to another embodiment of the present invention.

To provide the above described extensible scheduling for messages on a time-triggered bus, according to this embodiment of the invention, a two step process is performed. FIG. 4 is a flow chart diagram 62 showing a process for reallocating the time slots for the messages to provide extensibility. First the algorithm derives the initial message schedule for the time-triggered bus 26 within the optimized message time-window using a suitable algorithm at box 64. In other words, the algorithm determines a schedule for the message transmission on the time-triggered bus 26 to schedule the messages in the time slots so that all deadlines and precedence constraints are satisfied in the manner as discussed above. Suitable algorithms are known in the art to derive a schedule for a set of tasks with precedence relationships and different arrival times. For example, the article J. Blazewicz, "Scheduling Dependent Tasks with Different Arrival Times to Meet Deadlines," E. Gelenbe, Ed., Modeling and Performance Evaluation of Computer Systems, North-Holland Publishing Company (1976) discloses one such example. In this article, the arrival times and deadlines of the tasks 16 that are involved in precedence relationships are revised so that the precedence relationships are enforced by the revised arrival times and deadlines.

Next, an earliest-deadline-first (EDF) scheduling approach is used for the set of tasks with revised arrival times and deadlines without precedence relationships. The revision of the arrival times and the deadlines is performed by starting from the tasks 16 having no successor and processing on every step those tasks whose successors have been processed to revise the deadlines. This step is shown in the following equation.

$$D_k^* = \min(D_k, \min\{D_j^* - C_j; \text{ for all } j \text{ with "}k \text{ precedes } j\text{"}\}) \quad (19)$$

Starting from the tasks having no predecessor and processing on every step those tasks whose predecessors have been processed, the arrival times are revised as:

$$A_k^* = \max(A_k, \max\{A_j^* + C_j; \text{ for all } j \text{ with "}j \text{ precedes } k\text{"}\}) \quad (20)$$

Figure 5:
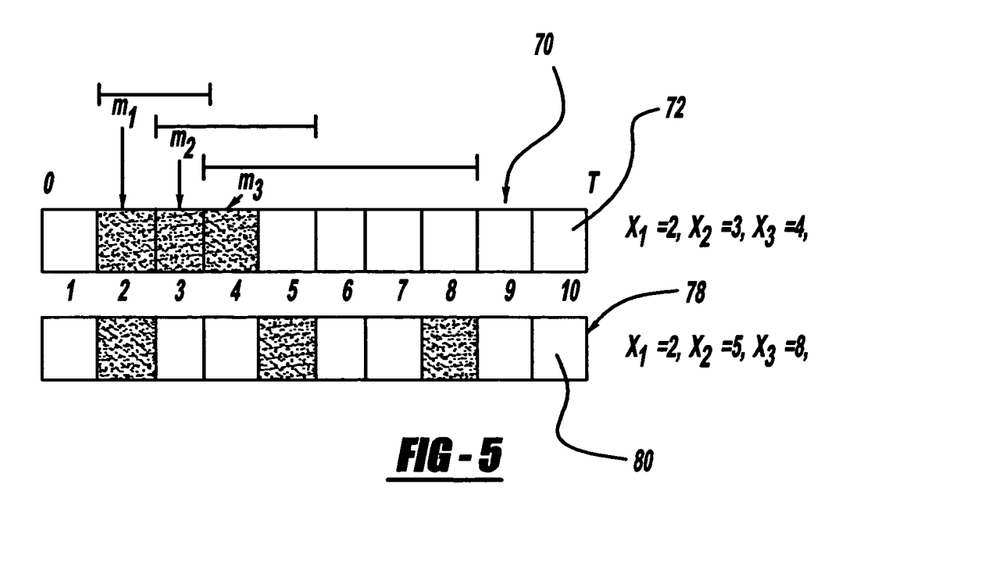
FIG. 5 is a diagram showing a technique for assigning messages to time slot for a scheduling algorithm of the invention.

Equations (19) and (20) identify the order of when the messages 28 will be transmitted in the transmission cycle. For example, FIG. 5 shows a time cycle 70 including ten time slots 72 where each message $m_1$, $m_2$ and $m_3$ is transmitted during the time cycle 70. The time cycle 70 repeats itself in that the messages $m_1$-$m_3$ are sent during each time cycle 70. In this example, based on the discussion above, the message $m_1$ must be sent within the time-window including the time slots 2 and 3, the message $m_2$ must be sent within time-window including the time slots 3-5 and the message $m_3$ must be sent within time window including the time slots 4-8 to meet the deadlines and precedent constraints discussed above. The length of the time-windows for the messages $m_1$-$m_3$ is different because of different types of messages and the priorities of the messages $m_1$-$m_3$. For the time cycle 70, the message $m_1$ is assigned the time slot 2, the message $m_2$ is assigned the time slot 3 and the message $m_3$ is assigned the time slot 4, which fulfills their time requirements at the beginning of each time-window period, but does not allow for future messages based on other precedence and constraints to be provided between the message $m_1$ and $m_2$, the message $m_1$ and $m_3$ and the message $m_2$ and $m_3$.

In the second step, the algorithm then redistributes the messages 28 within the transmission cycle 70 without violating the message order in the original schedule so that the precedent constraints are still satisfied, and without violating the message deadlines, so that the messages 28 are allocated as uniformly as possible within the transmission cycle 70. The purpose of the second step is for the extensibility. Because the arrival times and the deadlines for future messages are unknown, it is assumed that the arrivals of the later added messages are uniformly distributed over the transmission cycle 70. If the existing messages are distributed as uniformly as possible within the transmission cycle 70, then it is more likely to find appropriate unoccupied time slots 72 for later added messages for the upgrade. Therefore, there is less of a chance that the schedule for the remaining messages will have to be changed.

It is assumed that the transmission order of the messages m in the schedule is (1, 2, ..., M) and the slot assignments are $k_1 < k_2 < ... < k_M$, i.e., the message j is scheduled into the slot $k_j$. To provide the extensibility, it is necessary to reallocate the messages 28 as evenly as possible within the transmission cycle 70 without violating the message deadline and without violating the message transmission order determined by the initial schedule.

The process of reallocating the messages can be provided by an optimization model as follows. Let X [j] be the slot number that the message j is allocated to after the reallocation. The reallocation is then formulated as:

$$\text{Minimize}[\Sigma_{j=1 \text{ to } M-1}(X[j+1]-X[j]-1)^2 + (N+X[1]-X[M]-1)^2] \quad (21)$$

Subject to $A_j \leq X[j] \leq D_j$ fo j=1, 2, ..., M and $X[j]+1 \leq X[j+1]$ for j=1, 2, ..., (M−1)

If X[j] is required to be an integer for every j, then equation (21) becomes an integer programming problem. For the optimization, X[j] is allowed to be a real number, and the optimization then becomes a quadratic programming problem that can be solved more effectively by existing algorithms. The algorithm solves the quadratic programming problem for the initial message schedule based on equation (21) for the reallocation of the messages at box 66. The algorithm then rounds the real numbers of the solution down to the nearest integer and returns the solution as the extensible message schedule at box 68.

Referring back to FIG. 5, a second time cycle 78 including time slots 80 shows how the messages $m_1$-$m_3$ are reallocated in the transmission cycle 78 by equation (21). Particularly, message $m_1$ is still allocated to time slot 2, but message $m_2$ is allocated to time slot 5 and message $m_3$ is allocated to time slot 8. In this reallocation, all of the messages $m_1$-$m_3$ are transmitted during their assigned time-window, but the time slots 3 and 4 are left open between the time slots 2 and 5, the time slots 6 and 7 are left open between the time slots 5 and 8 and the time slots 9, 10 and 1 are left open between the time slots 8 and 2, thus allowing for other messages to be inserted into these open time slots later without changing the scheduling of the messages $m_1$-$m_3$.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for scheduling messages on a time-triggered bus, said method comprising:
   determining an initial message schedule for assigning the messages to time slots on the time-triggered bus; and
   reallocating the messages in the time slots to provide unused time slots between the messages.

2. The method according to claim 1 wherein determining the initial message schedule includes revising arrival times and deadlines of the messages so that precedence relationships are enforced.

3. The method according to claim 2 wherein determining the initial message schedule includes using an earliest-deadline-first schedule to change the arrival times and the deadlines without changing the precedent relationships.

4. The method according to claim 2 wherein revising the arrival times and deadlines includes revising the deadlines using the equation:

$$D_k^* = \min(D_k, \min\{D_j^* - C_j; \text{ for all } j \text{ with "}k \text{ precedes } j\text{"}\}),$$

and revising the arrival times using the equation:

$$A_k^* = \max(A_k, \max\{A_j^* + C_j; \text{ for all } j \text{ with "}j \text{ precedes } k\text{"}\}),$$

where D is the deadline, A is the arrival time and C is a worst case execution time.

5. The method according to claim 1 wherein reallocating the messages in the time slots includes solving a quadratic optimization problem.

6. The method according to claim 5 wherein the quadratic optimization problem is:

$$\text{Minimize}[\Sigma_{j=1 \text{ to } M-1}(X[j+1]-X[j]-1)^2+(N+X[1]-X[M]-1)^2]$$

Subject to $A_j \leq X[j] \leq D_j$ fo j=1, 2, ..., M and $X[j]+1 \leq X[j+1]$ for j=1, 2, ..., (M−1).

7. The method according to claim 5 further comprising rounding down real number solutions of the quadratic optimization problem to the nearest integer.

8. The method according to claim 1 wherein reallocating the messages in the time slots includes reallocating the messages in the time slots so the messages are substantially evenly spaced in a time cycle.

9. A method for scheduling messages on a time-triggered bus, said method comprising:
 determining an initial message schedule for assigning the messages to time slots on the time-triggered bus that includes using an earliest-deadline-first scheduling process; and
 reallocating the messages in the time slots to provide unused time slots between the messages, wherein reallocating the messages in the time slots includes solving for a quadratic optimization problem, and rounding real number solutions of the quadratic optimization problem down to the nearest integer.

10. The method according to claim 9 wherein determining the initial message schedule includes revising arrival times and deadlines of the messages so that precedence relationships are enforced and applying the earliest-deadline-first scheduling process to change the arrival time of the deadline without changing precedent relationships.

11. The method according to claim 10 wherein revising the arrival times and deadlines includes revising the deadlines using the equation:

$$D_k^* = \min(D_k, \min\{D_j^* - C_j; \text{ for all } j \text{ with "k precedes j"}\}),$$

and revising the arrival times with the equation:

$$A_k^* = \max(A_k, \max\{A_k^* + C_j; \text{ for all } j \text{ with "j precedes k"}\}),$$

where D is the deadline, A is the arrival time and C is a worst case execution time.

12. The method according to claim 9 wherein the quadratic optimization problem is:

$$\text{Minimize}[\Sigma_{j=1 \text{ to } M-1}(X[j+1]-X[j]-1)^2+(N+X[1]-X[M]-1)^2]$$

Subject to $A_j \leq X[j] \leq D_j$ fo j=1, 2, ..., M and $X[j]+1 \leq X[j+1]$ for j=1, 2, ..., (M−1).

13. The method according to claim 9 wherein reallocating the messages in the time slots includes reallocating the messages in the time slots so the messages are substantially evenly spaced in a time cycle.

14. A system for scheduling messages on a time-triggered bus, said system comprising:
 means for determining an initial message schedule for assigning the messages to time slots on the time-triggered bus; and
 means for reallocating the messages in the time slots to provide unused time slots between the messages.

15. The system according to claim 14 wherein the means for determining the initial message schedule includes means for revising arrival times and deadlines of the messages so that precedence relationships are enforced.

16. The system according to claim 15 wherein the means for revising arrival times and deadlines of the messages includes means for using an earliest-deadline-first scheduling process.

17. The system according to claim 14 wherein the means for reallocating the messages in the time slots includes means for solving a quadratic optimization problem.

18. The system according to claim 17 wherein the means for solving the quadratic optimization problem includes means for rounding down real number solutions of the quadratic optimization problem to the nearest integer.

19. The system according to claim 17 wherein the quadratic optimization problem is:

$$\text{Minimize}[\Sigma_{j=1 \text{ to } M-1}(X[j+1]-X[j]-1)^2+(N+X[1]-X[M]-1)^2]$$

Subject to $A_j \leq X[j] \leq D_j$ fo j=1, 2, ..., M and $X[j]+1 \leq X[j+1]$ for j=1, 2, ..., (M−1).

20. The system according to claim 14 wherein the means for reallocating the messages includes means for substantially spacing the messages evenly apart in the time slots.

* * * * *